United States Patent
Karunakaran et al.

(10) Patent No.: US 11,104,814 B2
(45) Date of Patent: Aug. 31, 2021

(54) PRIMER FORMULATIONS WITH IMPROVED PHOTOSTABILITY

(71) Applicant: MOMENTIVE PERFORMANCE MATERIALS INC., Waterford, NY (US)

(72) Inventors: Raghuraman Govindan Karunakaran, Hosur (IN); Karthikeyan Murugesan, Bangalore (IN); Indumathi Ramakrishnan, Bangalore (IN); Robert Hayes, Mechanicville, NY (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 15/043,725

(22) Filed: Feb. 15, 2016

(65) Prior Publication Data

US 2017/0233590 A1    Aug. 17, 2017

(51) Int. Cl.
| | |
|---|---|
| C09D 7/62 | (2018.01) |
| C08K 9/06 | (2006.01) |
| C09D 133/12 | (2006.01) |
| C09D 5/00 | (2006.01) |
| C09D 5/32 | (2006.01) |
| C09D 5/02 | (2006.01) |

(52) U.S. Cl.
CPC ............ C09D 7/62 (2018.01); C09D 5/002 (2013.01); C09D 5/02 (2013.01); C09D 5/32 (2013.01); C09D 133/12 (2013.01); C08K 9/06 (2013.01)

(58) Field of Classification Search
CPC .................. C08K 9/06; C09D 7/62
See application file for complete search history.

(56) References Cited

U.S. PATENT DOCUMENTS

| | | | | |
|---|---|---|---|---|
| 3,901,844 A * | 8/1975 | Schiller | ......... | H01B 3/426 524/407 |
| 4,799,963 A | 1/1989 | Basil et al. | | |
| 5,411,761 A * | 5/1995 | Inokuchi | ......... | C01G 23/047 427/212 |
| 6,080,834 A * | 6/2000 | Putzig | ......... | B01J 31/0212 502/103 |
| 6,261,700 B1 * | 7/2001 | Olson | ......... | B82Y 30/00 428/522 |
| 7,265,176 B2 * | 9/2007 | Troeltzsch | ......... | B32B 17/10009 524/261 |
| 2006/0167126 A1 * | 7/2006 | Goto | ......... | C09D 4/00 522/81 |
| 2009/0009712 A1 | 1/2009 | Back | | |
| 2009/0298989 A1 * | 12/2009 | Funston, Sr. | ......... | C09D 175/04 524/440 |
| 2010/0261022 A1 * | 10/2010 | Higuchi | ......... | C09D 5/32 428/446 |
| 2011/0064942 A1 * | 3/2011 | Sawada | ......... | H01L 31/048 428/328 |
| 2013/0309423 A1 | 11/2013 | Roger et al. | | |

FOREIGN PATENT DOCUMENTS

| | | |
|---|---|---|
| CN | 102719151 | 10/2012 |
| CN | 103228729 | 7/2013 |
| EP | 0465918 A2 | 1/1992 |
| EP | 0545347 A1 | 6/1993 |
| EP | 0732356 A2 | 9/1996 |
| JP | 2002097423 A * | 4/2002 |
| JP | 2010-066740 | 3/2010 |
| JP | 2013-227520 | 11/2013 |
| WO | 2015089045 A1 | 6/2015 |

OTHER PUBLICATIONS

Machine translation of JP 2002-097423 A, published Apr. 2, 2002. (Year: 2002).*
Patent Cooperation Treaty (PCT), International Search Report and Written Opinion for Application PCT/US2017/015567 filed Jan. 30, 2017, dated May 5, 2017, International Searching Authority, EP.

* cited by examiner

*Primary Examiner* — Vickey Nerangis
(74) *Attorney, Agent, or Firm* — James C. Abruzzo; McDonald Hopkins LLC (57) ABSTRACT

A primer composition comprising metal oxide particles modified with an alkyltrialkoxy silane; an organic polymer; and a solvent. The weight ratio of alkyltrialkoxy silane to metal particles is at least 0.9:1. The primer compositions produce films having excellent optical and adhesion characteristics.

17 Claims, 4 Drawing Sheets

PRIMER FORMULATIONS WITH IMPROVED PHOTOSTABILITY

FIELD

The disclosed technology relates to primer formulations, coatings comprising such formulations, and articles coated with such formulations. In particular, the disclosed technology relates to primer formulations comprising metal oxide particles modified or functionalized with a silane. The formulations may be used to produce films having excellent optical and adhesion characteristics as well as good optically, storage stability, thermal, and UV stability.

BACKGROUND

Primer coat assemblies containing inorganic UV absorbers in place of organic UV absorbers can provide extended weatherability to the underlying polymeric substrates. However, some problems that result from replacing organic UV absorbers with inorganic UV absorber are the poor dispersion of these inorganic UV absorbers in the primer matrix and photodegradation of the primer due to the presence of the inorganic UV absorbers.

A key factor that influences the weathering performance of protective coatings designed for polycarbonate is the photostability of the UV absorber incorporated into the coating layers. Inorganic metal oxides such as $TiO_2$, ZnO, and $CeO_2$ are found to be chemically inert, possess excellent thermal stability, show strong UV absorption and their photodegradation rate is significantly low; however, incorporating them into nano dimensions in an organic or a silicone matrix has been challenging. One of the main challenges is incorporating the oxides into a matrix that remains stable upon UV exposure while retaining the optical and adhesion characteristics of the coating. Among the various metal oxide particles, cerium oxide ($CeO_2$) is much more attractive due to its combined unique properties such as high oxygen storage capacity, high ionic conductivity, relatively high mechanical strength, strong absorption/luminescence in ultra-violet region, high hardness and lower photo catalytic activity. The use of colloidal cerium oxide as a UV absorber in silicone resin hardcoats is described in U.S. Pat. No. 4,799,963. The examples described in the '963 patent are not specific with respect to the grade of colloidal cerium oxide or colloidal silica used to synthesize the coatings. Further, the '963 patent describes formulations containing only about 5% $CeO_2$ by weight in the dry film. Incorporating inorganic UV absorbers, such as ceria, in an organic primer coating composition without adversely affecting the optical properties in the resulting coating is difficult. A significant challenge is the long term stability of dispersing these inorganic oxides in an organic primer matrix without causing agglomeration.

Also, the use of higher loadings of these inorganic oxides, which provides maximum UV screening while maintaining the optical transparency of the coatings is challenging. For example, EP0732356 discloses the use of ceria organo sol in acrylic primer formulations. It also discloses water as a co-solvent to disperse ceria in the primer formulation. The presence of water significantly affects the optical properties of the resulting coated film. Also, water is an anti-solvent for PMMA primer formulations. For practical applications, having a primer formulation with UV absorber of higher solids content is desirable for the coating so that dry film thicknesses can be provided that can sustain adequate protection in outdoor weather conditions. Prior attempts at such solutions have not provided a protective coating composition for the polymeric substrates that is effective to provide sufficient long-term outdoor weatherability, optical clarity, and abrasion resistance. Consequently, there is still a need to provide protective coating compositions for polymeric substrates that overcome the above-identified challenges.

SUMMARY

The present technology and invention provides a primer formulation for coating a substrate, films formed from such compositions, and articles and substrates coated with such compositions or films. The present invention provides stable primer compositions that comprise inorganic UV absorbing materials. The present invention also provides coatings or films formed from such composition. The coatings may exhibit good adhesion properties, good optical properties, good storage stability, good thermal stability, or combinations of two or more of these properties.

In one aspect, the present invention provides a primer composition comprising functionalized metal oxide particles.

In one embodiment, the primer composition comprises:
(a) metal oxide particles modified with a silane of the formula:

where $R^1$, $R^2$, $R^3$, and $R^4$ are independently chosen from a C1-C10 alkyl;
(b) an organic polymer; and
(c) a solvent.

In one embodiment of the primer composition of any previous aspect or embodiment, $R^1$, $R^2$, $R^3$, and $R^4$ are independently chosen from a C1-C4 alkyl.

In one embodiment of the primer composition of any previous aspect or embodiment, $R^1$, $R^2$, $R^3$, and $R^4$ are each methyl.

In one embodiment of the primer composition of any previous aspect or embodiment, the metal oxide particles are chosen from cerium oxide, titanium oxide, zinc oxide, or a combination of two or more thereof.

In one embodiment of the primer composition of any previous aspect or embodiment, the organic polymer is chosen from a homopolymer of an alkyl acrylate, a copolymer of an alkyl acrylate, a polyurethane, a polycarbonate, a, a polyvinylpyrrolidone, a polyvinylbutyral, a poly(ethylene terephthalate), poly(butylene terephthalate), or a combination of two or more thereof.

In one embodiment of the primer composition of any previous aspect or embodiment, the weight ratio of silane to metal oxide particles is at least 0.9:1.

In one embodiment of the primer composition of any previous aspect or embodiment, the weight ratio of silane to metal oxide particles is 0.9:1 to about 2:1.

In one embodiment of the primer composition of any previous aspect or embodiment, the solvent is chosen from an alcohol, an ester, a ketone, an ether, or a combination of two or more thereof.

In one aspect, the present invention provides a substrate coated with a primer composition according to any of the previous embodiments.

In one aspect, the present invention provides a primer film formed from a primer composition according to any of the previous embodiments.

In one embodiment, the primer film comprises (i) an organic polymer in an amount of from about 45 wt. % to about 80 wt. %, (ii) metal oxide particles in an amount of from about 10 wt. % to about 20 wt. %, and (iii) a silane in an amount of from about 10 wt. % to about 30 wt. %, the wt. % being based on the weight of the dry film, and wherein the weight ratio of silane to metal oxide particles is 0.9:1 or greater.

In one embodiment, the weight ratio of silane to metal oxide particles is 0.9:1 to about 2:1.

In one aspect, the present invention provides a substrate comprising a coating formed from a primer composition in accordance with aspects and embodiments of the present invention.

In one embodiment, the present invention provides a substrate and a primer film disposed on at least a portion of a surface of the substrate, the primer film comprising:

(a) metal oxide particles modified with a silane of the formula:

where $R^1$, $R^2$, $R^3$, and $R^4$ are independently chosen from a C1-C10 alkyl; and (b) an organic polymer.

In one embodiment of the substrate of any previous aspect or embodiment, $R^1$, $R^2$, $R^3$, and $R^4$ are independently chosen from a C1-C4 alkyl.

In one embodiment of the substrate of any previous aspect or embodiment, $R^1$, $R^2$, $R^3$, and $R^4$ are each methyl.

In one embodiment of the substrate of any previous aspect or embodiment, the metal oxide particles are chosen from cerium oxide, titanium oxide, zinc oxide, or a combination of two or more thereof.

In one embodiment of the substrate of any previous aspect or embodiment, the organic polymer is chosen from homo and copolymers of alkyl acrylates, polyurethanes, polycarbonates, polyvinylpyrrolidone, polyvinylbutyrals, poly(ethyleneterephthalate), poly(butylene terephthalate), or a combination of two or more thereof.

In one embodiment of the substrate of any previous aspect or embodiment, the weight ratio of silane to metal oxide particles is at least 0.9:1.

In one embodiment of the substrate of any previous aspect or embodiment, the weight ratio of silane to metal oxide particles is 0.9:1 to about 2:1.

In one embodiment of the substrate of any previous aspect or embodiment, the primer film comprises (i) the organic polymer in an amount of from about 45 wt. % to about 80 wt. %, (ii) the metal oxide particles in an amount of from about 10 wt. % to about 25 wt. %, and (iii) the silane in an amount of from about 10 wt. % to about 30 wt. %, the wt. % being based on the weight of the dry film, and wherein the weight ratio of silane to metal oxide particles is 0.9:1 or greater. In an embodiment, the silane may be an alkyltrialkoxy silane.

In one embodiment of the substrate of any previous aspect or embodiment, the substrate comprises a silicone hardcoat layer overlying the primer film.

In one embodiment of the substrate of any previous aspect or embodiment, the substrate is chosen from an acrylic polymer, a polyamide, a polyimide, an acrylonitrile-styrene copolymer, a styrene-acrylonitrile-butadiene terpolymer, a polyvinyl chloride, a polyolefin, a polycarbonate, a copolycarbonate, or a combination of two or more thereof.

These and other aspects and embodiments are further understood with respect to the following detailed description.

DETAILED DESCRIPTION

The present technology is directed to the use of surface modified inorganic particles in a coating composition. The surface modified inorganic particles may be employed as UV absorbers in coating compositions. The present surface modified inorganic particles have been found to stabilize the inorganic particles in a polymer matrix. This allows for more uniform dispersion of the particles in the polymer matrix and in coating formulations formed from such dispersions or compositions. Compositions comprising such modified metal particles may be used as primer compositions in coating applications. The modified metal particles are generally disbursed uniformly in the coating without agglomerating. Consequently, the compositions exhibit long shelf life and good optical properties in the final coating. The primer is particularly suitable for use with silicone hard coats and provides an overall coating with high transmittance, low haze, and good adhesion to substrates.

The primer compositions comprise (a) inorganic metal oxide particles surface modified with a silane, such as an alkyltrialkoxy silane; (b) an organic polymer; and (c) a solvent. The surface modified inorganic particles comprise inorganic metal particles that have been surface modified with an alkyltrialkoxy silane. As used herein, the surface modified inorganic metal particles may also be referred to as functionalized inorganic metal particles. Without wishing to be bound to any particular theory, the surface modification or functionalization of the inorganic particles by the alkyltrialkoxy silane is believed to be via non-covalent binding. It is believed that that the alkyltrialkoxy silane forms a network and substantially encapsulates the particles. Again not wishing to be bound by any particular theory, the alkyltrialkoxy silane may encapsulate the inorganic particles by, for example, core shell morphology. Further, the individual silane moieties are believed to offer physical stability to the surface-modified nanoparticles in suspension due to steric repulsion attributable to the silane moieties.

The metal particles used in the composition of the invention are not particularly limited. Generally, the metal particles will be metal oxide particles. Suitable examples include, but are not limited to, cerium oxide, titanium oxide, zinc oxide particles, or a combination of two or more thereof. In one embodiment, the metal oxide nanoparticles are cerium oxide nanoparticles.

The size of the metal oxide particles may be selected as desired for a particular purpose or intended application. In embodiments, the metal oxide particles are nanosized particles. Nanoparticles may have dimensions in the range of one to about 500 nanometers. For clear coat applications, the particles should have a size below a certain limit such that it will not scatter light passing through the coating. Particles with dimensions less than λ/2 do not scatter light of λ, where λ is the wavelength of light, and will not disrupt the transparency of the matrix in which they are incorporated. In embodiments, the metal particles have a diameter of 190 nanometers or less. In other embodiments, the metal particles have a diameter of from about 1 nm to about 190 nm; from about 5 nm to about 175 nm; from greater than 25 nm to about 150 nm; or from about 50 nm to about 100 nm. Here as elsewhere in the specification and claims, numerical values may be combined to form new and non-disclosed ranges.

The amount of the metal oxide nanoparticles surface-modified with an alkyltrialkoxy silane moiety in the composition of the invention ranges from about 0.1 to about 10 wt. %, preferably from about 0.1 to about 5 wt. %, more preferably from about 0.5 to about 3 wt. %, and most preferably from about 1 wt % to about 3 wt %, all based on the total weight of the composition. Here as elsewhere in the specification and claims, numerical values may be combined to form new and non-disclosed ranges.

The amount of the silane moiety that surface-modifies the metal oxide nanoparticles preferably ranges from about 200 to about 420 wt. %, based on the total weight of the metal oxide particles, from about 200 to about 280 wt. %, based on the total weight of the metal oxide particles; from about 340 to 400 wt. % based on the total weight of metal oxide particles. This provides a weight ratio of silane to metal of about 0.9:1 to about 2:1. Here as elsewhere in the specification and claims, numerical values may be combined to form new and non-disclosed ranges.

The alkyltrialkoxy silane employed to functionalize the inorganic particles may be chosen as desired for a particular purpose or intended application. In embodiments, the alkyltrialkoxy silane is of the formula:

where $R^1$, $R^2$, $R^3$, and $R^4$ are independently chosen from a C1-C10 alkyl. In embodiments, $R^1$-$R^4$ are independently chosen from a C1-C4 alkyl or a C1-C2 alkyl. In embodiments, $R^1$-$R^4$ is methyl. It will be appreciated, that a combination of alkyltrialkoxy silanes may be employed to modify or functionalize the inorganic particles. Examples of suitable trialkoxysilanes include, but are not limited to, methyltrimethoxysilane, methyltriethoxysilane, ethyltrimethoxysilane, ethyltriethoxysilane, isobutyltrimethoxysilane, isobutyltriethoxysilane, or a combination thereof.

The organic polymer component of the invention is not particularly limited. Suitable polymers useful in the composition of the present invention include, but are not limited to, homo and copolymers of alkyl acrylates, polyurethanes, polycarbonates, polyvinylpyrrolidone, polyvinylbutyrals, poly(ethylene terephthalate), poly(butylene terephthalate), as well as combinations of these. In embodiments, the organic polymer is polymethylmethacrylate. The amount of the organic polymer in the composition of the invention may range preferably from about 0.5 to about 15 wt. %, from about 2 to about 10 wt. %, or from about 3 to about 8 wt. %, all based on the total weight of the composition.

In addition to the organic polymer and the metal particles modified with a silane moiety described herein, the primer composition of the invention further includes a solvent. The solvent is not particularly limited. Examples of suitable solvents include, but are not limited to, alcohols, such as methanol, ethanol, propanol, isopropanol, n-butanol, tertbutanol, methoxypropanol, ethylene glycol, diethylene glycol butyl ether, or combinations thereof. Other polar organic solvents such as acetone, methyl ethyl ketone, ethylene glycol monopropyl ether, and 2-butoxy ethanol, can also be utilized. In embodiments, the solvent used is one or more selected from 1-methoxy-2-propanol, diacetone alcohol (DAA), acetyl acetone, cyclohexanone, methoxypropylacetate, ketones, glycol ether, or mixtures of two or more thereof. The amount of solvent in the composition ranges preferably from about 70 wt. % to about 95 wt. %, more preferably from about 75 wt. % to about 85 wt. %, and most preferably from about 85 wt. % to about 95 wt. %, all based on the total weight of the composition.

The primer composition of the invention may further include optional additional additives such as UV absorbing agents, antiblushing agents, leveling agents, surface lubricants, antioxidants, light stabilizers, surfactants, IR absorbing agents, and combinations thereof.

The metal oxide particles surface-modified with a silane moiety may be prepared by mixing the metal oxide particles and silane in a suitable solvent, removing water and solvent, for example, under vacuum to produce a viscous liquid or gel residue, and dissolving the residue in an organic solvent such as diacetone alcohol or 1-methoxy-2-propanol. The primer composition of this invention can be prepared by simply mixing the surface-modified particles, the acrylic polymer, and other suitable optional ingredients in a solvent. The order of mixing of the components is not critical. The mixing can be achieved through any means known to a person skilled in the art, for example, milling, blending, stirring, etc. The primer compositions with varying loading of surface-modified nanoparticles $CeO_2$ are found to be stable for several months or greater than 1 year.

The primer compositions of the present invention can be suitably coated onto a polymeric substrate, such as a plastic surface. Examples of such plastics include, but are not limited to, synthetic organic polymeric materials, such as acrylic polymers, for example, poly(methylmethacrylate), and the like; polyesters, for example, poly(ethylene terephthalate), poly(butylene terephthalate), and the like; polyamides, polyimides, acrylonitrile-styrene copolymer, styrene-acrylonitrilebutadiene terpolymers, polyvinyl chloride, polyethylene, and the like, polycarbonates, copolycarbonates and high-heat polycarbonates.

A particularly suitable substrate is formed from polycarbonate or an acrylic resin. Polycarbonates are especially suitable materials for transparent substrates because of their excellent physical, mechanical and chemical properties. In general, the choice of substrate is ultimately determined by the contemplated end use.

Once the primer composition of the invention is coated on a substrate by flow coat, dip coat, spin coat or any other suitable methods in the field, it is allowed to dry by removal of any solvents, for example by evaporation, thereby leaving a dry coating. Heating of the primer composition, to aid in evaporation of solvents, can be done up to a maximum temperature defined by the heat distortion temperature of the substrate to provide a primer layer that is free of solvent.

A primer film formed from the primer composition may comprise at least about 45 wt. % of the organic polymer based on the total weight of the film. In embodiments, the primer film comprises from about 45 wt. % to about 80 wt. % of the organic polymer (based on the total weight of the film; from about 50 wt. % to about 80 wt. %); from about 55 wt. % to about 75 wt. %; or from about 60 wt. % to about 70 wt. %. In embodiments, the primer film comprises from about 45 wt. % to about 65 wt. % of the organic polymer; even from about 50 wt. % to about 60 wt. % based on the total weight of the film. The film is provided such that the weight ratio of alkyltrialkoxy silane to inorganic metal particles is at least 0.9:1 (wt./wt.). The weight ratio of alkyltrialkoxy silane to inorganic metal particles may be from about 0.9:1 to about 2:1; from about 0.95:1 to about 1.8:1; from about 1:1 to 1.6:1; even from about 1.2:1 to about 1.4:1 In embodiments, the film comprises the inorganic metal oxide particles in an amount of from about 10 wt. % to about 25 wt. %; from about 12 wt. % to about 20 wt. %; even from about 14 wt. % to about 16 wt. %; and the alkyltrialkoxy silane in an amount of from about 10 wt. % to about 30 wt. %; from about 12 wt. % to about 25 wt. % from about 15 wt. % to about 20 wt. %. Here as elsewhere in the specification and claims, numerical values may combine to form new and non-disclosed ranges. When referring to the concentration of the components in the film, the weight percentages are based on the weight of the dry film.

In one embodiment, the primer film comprises from about 10 wt. % of the inorganic metal particles and about 10 wt. % of the alkyltrialkoxy silane. In another embodiment, the primer film comprises from about 15 wt. % of the inorganic metal particles and about 15 wt. % of the alkyltrialkoxy silane. In another embodiment, the primer film comprises from about 20 wt. % of the inorganic metal particles and about 20 wt. % of the alkyltrialkoxy silane. In another embodiment, the primer film comprises from about 10 wt. % of the inorganic metal particles and about 20 wt. % of the alkyltrialkoxy silane. In still another embodiment, the primer film comprises from about 15 wt. % of the inorganic metal particles and about 30 wt. % of the alkyltrialkoxy silane.

The primer layer formed from the primer composition of the invention is effective in providing adhesion of an abrasion resistant topcoat layer to a substrate and can be used as part of a coated article of the invention. Thus, in accordance with another embodiment of the invention, there is provided a coated article including a polymeric substrate, a primer layer disposed on at least one surface of said substrate, and an abrasion-resistant silicone hardcoat layer disposed on said primer layer, wherein said primer layer is made from a primer composition comprising the silane modified metal particles.

The primer may be coated on a substrate by flow coat, dip coat, spin coat, or any other methods known to a person skilled in the field, it is allowed to dry by removal of any solvents, for example by evaporation, thereby leaving a dry coating. The primer may subsequently be cured. Additionally, a topcoat (e.g., a hardcoat layer) may be applied on top of the dried primer layer by flow coat, dip coat, spin coat, or any other methods known to a person skilled in the field. Optionally, a topcoat layer may be directly applied to the substrate without a primer layer.

The primer can be applied to any suitable substrate. Examples of suitable substrates include, but are not limited to, organic polymeric materials such as acrylic polymers, e.g., poly(methylmethacrylate), polyamides, polyimides, acrylonitrile-styrene copolymer, styrene-acrylonitrile-butadiene terpolymers, polyvinyl chloride, a polyolefin, e.g., polyethylene, polycarbonates, copolycarbonates, high-heat polycarbonates, combinations thereof and any other suitable material.

A silicone hardcoat is formed by first applying a coating composition onto the primer layer, followed by curing the composition. The silicone hardcoat composition is not particularly limited. Silicone hardcoats comprised of a siloxanol resin/colloidal silica dispersions are one example of a coating composition that may be used as a topcoat. The silicone hardcoat may contain additional organic UV-absorbing agents if desired, but the loading can be lower than those that do not have inorganic absorbing agent in either the primer layer or the hardcoat layer. Thus the abrasion integrity is maintained and in some cases improved by limiting the amount of organic UV-absorbing agent, while at the same time, the weatherability is improved.

The following examples are illustrative and not to be construed as limiting of the invention as disclosed and claimed herein. All parts and percentages are by weight and all temperatures are degrees Celsius unless explicitly stated otherwise. All patent applications, patents, and other publications cited herein are incorporated by reference in their entireties.

EXAMPLES

Surface Functionalization of Ceria with Silanes
Preparation of Organo Sol [S-1]
Surface Functionalization Using Methyl Trimethoxysilane (MTMS)

Figure 1:
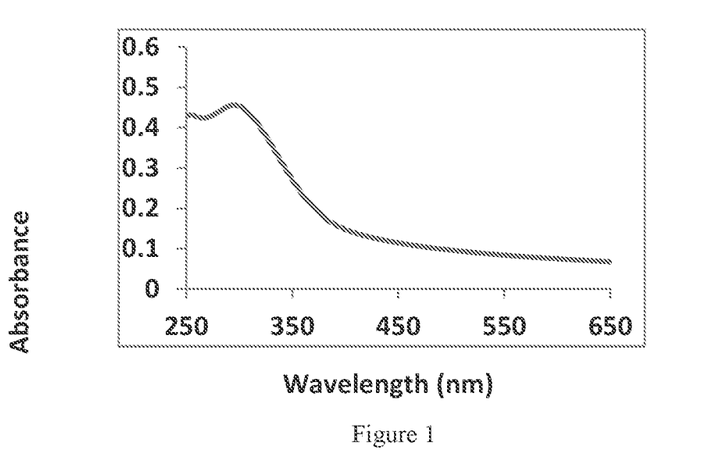
FIG. 1 is a UV-Vis Spectrum of $CeO_2$ stabilized in an aqueous medium with acetate ions.
Figure 2:
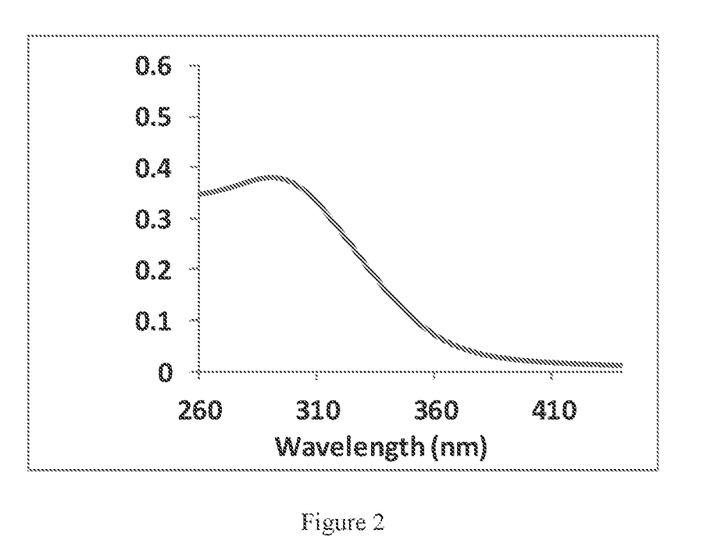
FIG. 2 is a UV-Vis Spectrum of a silane functionalized $CeO_2$ in accordance with embodiments of the technology.

10.0 g of cerium oxide dispersion (Nyacol® $CeO_2$ ACT, 20 wt. % in aq. medium, stabilized with 2.5% acetic acid, 2.0 g of $CeO_2$) was taken in a clean 250 mL round bottom flask and 50 mL of 1-methoxy-2-propanol (MP) was added to it and stirred for few a minutes. 4.0 g of MTMS (Momentive Performance Materials, Silquest® A-163 Silane) (200 wt. % with respect to $CeO_2$) was then added to the above solution in drop wise with vigorous stirring. After 20 min. of stirring, 4 mL of 0.001 M NaOH solution was added drop wise (approximately 1 mL/min.) and the reaction mixture was stirred at room temperature for 2 h. Then the solvents were removed under vacuum at 70° C. and 80 mbar pressure. The resulting organo sol was transferred to a storage container. The final weight percentage of solids was measured. The UV-Vis Spectrum of $CeO_2$ in aqueous medium and after functionalizing it with MTMS in organo sol was shown in FIGS. 1 and 2, respectively.

Figure 3:
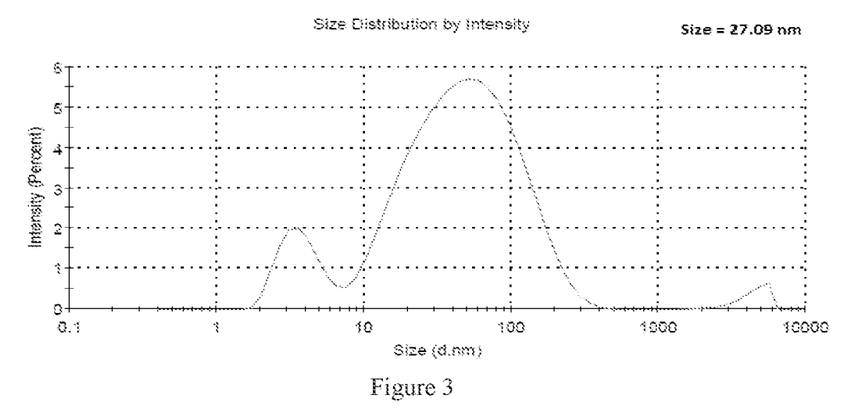
FIG. 3 is a graph showing particle size distribution of a commercially available $CeO_2$.
Figure 4:
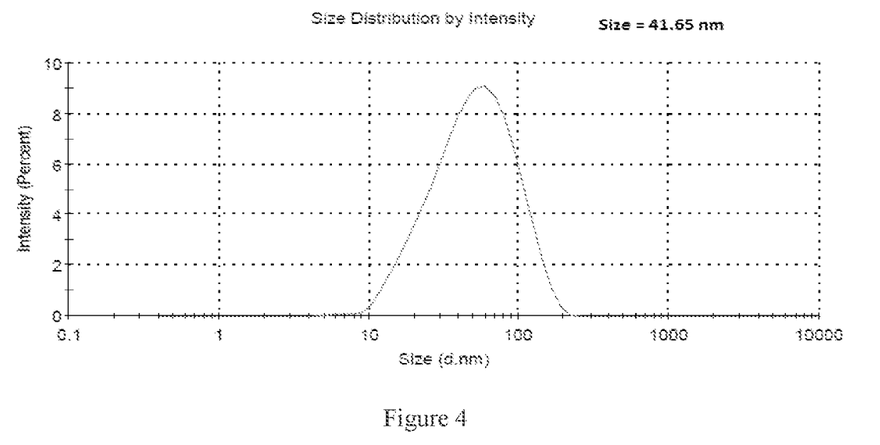
FIG. 4 is a graph showing particle size distribution of a functionalized $CeO_2$ in accordance with embodiments of the technology.

The size of the commercially available $CeO_2$ nanoparticles and after functionalizing it with 200 wt. % MTMS was shown in FIGS. 3 and 4, respectively.

Preparation of Organo Sol [S-2]

Surface Functionalization Using Methyl Trimethoxysilane (MTMS)

10.0 g of cerium oxide dispersion (Nyacol® $CeO_2$ ACT, 20 wt. % in aq. medium, stabilized with 2.5% acetic acid, 2.0 g of $CeO_2$) was taken in a clean 250 mL round bottom flask and 50 mL of 1-methoxy-2-propanol (MP) was added to it and stirred for few a minutes. 8.0 g of MTMS (Momentive Performance Materials, Silquest® A-163 Silane) (400 wt. % with respect to $CeO_2$) was then added to the above solution in drop wise with vigorous stirring. After 20 min. of stirring, 4 mL of 0.001 M NaOH solution was added drop wise (approximately 1 mL/min.) and the reaction mixture stirred at room temperature for 2 h. Then the solvents were removed under vacuum at 70° C. and 80 mbar pressure. The resulting organo sol was transferred to a storage container. The final weight percentage of solids was measured.

Preparation of Organo Sol [S-3]
Surface Functionalization Using Trimethoxysilylpropyloligo (Ethyleneglycol) Methylether (Silquest® A-1230 Silane)

10.0 g of cerium oxide dispersion (Nyacol® $CeO_2$ ACT, 20 wt. % in aq. medium, stabilized with 2.5% acetic acid, 2.0 g of $CeO_2$) was taken in a clean 250 mL round bottom flask and 50 mL of 1-methoxy-2-propanol (MP) was added to it and stirred for a few minutes. 0.4 g of PEG-silane (Momentive Performance Materials, Silquest® A-1230 Silane) (20 wt. % with respect to $CeO_2$) was then added to the above solution in drop wise with vigorous stirring. After 20 min. of stirring, 4 mL of 0.001 M NaOH solution was added drop wise (approximately 1 mL/min.) and the reaction mixture was stirred at room temperature for 2 h. Then the solvents were removed under vacuum at 70° C. and 80 mbar pressure. The resulting organo sol was transferred to a storage container. The final weight percentage of solids was measured.

Preparation of Organo Sol [S-4]
Surface Functionalization Using Methacryloxypropyl Trimethoxy Silane (Silquest® A-174 Silane)

10.0 g of cerium oxide dispersion (Nyacol® $CeO_2$ ACT, 20 wt. % in aq. medium, stabilized with 2.5% acetic acid, 2.0 g of $CeO_2$) was taken in a clean 250 mL round bottom flask and 50 mL of 1-methoxy-2-propanol (MP) was added to it and stirred for a few minutes. 0.4 g of methacryloxypropyl trimethoxy silane (Momentive Performance Materials, Silquest® A-174 Silane) (20 wt. % with respect to $CeO_2$) was then added to the above solution in drop wise with vigorous stirring. After 20 min. of stirring, 4 mL of 0.001 M NaOH solution was added drop wise (approximately 1 mL/min.) and the reaction mixture was stirred at room temperature for 2 h. Then the solvents were removed under vacuum at 70° C. and 80 mbar pressure. The resulting organo sol was transferred to a storage container. The final weight percentage of solids was measured.

Preparation of Organo Sol [S-5]
Surface Functionalization Using Gamma-Glycidoxypropyltrimethoxy Silane (Silquest® A187 Silane)

10.0 g of cerium oxide dispersion (Nyacol® $CeO_2$ ACT, 20 wt. % in aq. medium, stabilized with 2.5% acetic acid, 2.0 g of $CeO_2$) was taken in a clean 250 mL round bottom flask and 50 mL of 1-methoxy-2-propanol (MP) was added to it and stirred for a few minutes. 4.28 g of glycidoxypropyltrimethoxy silane (Momentive Performance Materials, Silquest® A-187 Silane) (214 wt. % with respect to $CeO_2$) was then added to the above solution in drop wise with vigorous stirring. After 20 min. of stirring, 4 mL of 0.001 M NaOH solution was added drop wise (approximately 1 mL/min.) and the reaction mixture was stirred at room temperature for 2 h. Then the solvents were removed under vacuum at 70° C. and 80 mbar pressure. The resulting organo sol was transferred to a storage container. The final weight percentage of solids was measured. Table 1 shows the % solids and the weight fraction (percent) of $CeO_2$ and silane.

TABLE 1

The weight ratio of $CeO_2$ and silanes in Organo Sols

| Sample ID | Silane | % Solids in Organo Sol | Stability of the Sol | Wt. Fraction in Sol | | Ratio of Silane:$CeO_2$ |
|---|---|---|---|---|---|---|
| | | | | $CeO_2$ | Silane | |
| S-1 | A-163 | 10.3% | >12 months | 50.37% | 49.63% | 0.99 |
| S-2 | A-163 | 16.11% | >12 months | 33.66% | 66.34% | 1.97 |
| S-3 | A-1230 | 4.97% | >12 months | 85.2% | 14.8% | 0.17 |
| S-4 | A-174 | 6.43% | >12 months | 87.39% | 12.61% | 0.14 |
| S-5 | A-187 | 14.71% | >12 months | 42.88% | 58.12% | 1.36 |

Preparation of Primer Solutions

To a 3-necked 500 mL RB flask, fitted with reflex condenser and overhead stirrer, a solvent mixture of 1-methoxy-2-propanol (382.5 g) and diacetone acetone alcohol (DAA) (67.5 g) (in the weight ratio of 85:15) were added and stirred at 40° C. 50 g of PMMA (Elvacite® 2041, Lucite International, Inc., Cordova, Tenn.) was added to this solvent mixture in portions, and the stirring was continued until the complete dissolution of PMMA resulted in a clear solution. The solution was subsequently cooled to room temperature and the weight percentages of solids were measured in an oven at 130° C. for 20 min.

Example [E-1]

Preparation of Primer Formulation Using Silquest® A-163 Silane-$CeO_2$ Sol

To a 20.0 g of a 9.02% PMMA solution, 12.24 g of ceria sol S-1 was added along with 15 mg of BYK™-331. The primer mixture was shaken well to dissolve the ceria sol which resulted in a straw yellow formulation which was stable over 12 months without any precipitation. The solid contents were measured and then using a 85:15 mixture of 1-methoxy-2-propanol and diacetone alcohol, the formulations were diluted to 5.14% solids content. The resultant solution was filtered through 0.45 µm filter prior to use.

Example [E-2]

Preparation of Primer Formulation Using Silquest® A-163 Silane-$CeO_2$ Sol

To a 20.0 g of an 11.03% PMMA solution, 8.3 g of ceria sol S-1 was added along with 15 mg of BYK™-331. The primer mixture was shaken well to dissolve the ceria sol which resulted in a straw yellow formulation solution. The solid contents were measured and then using a 85:15 mixture of 1-methoxy-2-propanol and diacetone alcohol, the formulations were diluted to 7.19% solids content. The resultant solution was filtered through 0.45 µm filter prior to use.

Example [E-3]

Preparation of Primer Formulation Using Silquest® A-163 Silane-CeO$_2$ Sol

To a 20.0 g of an 11.03% PMMA solution, 4.9 g of ceria sol S-1 was added along with 15 mg of BYK™-331. The primer mixture was shaken well to dissolve the ceria sol which resulted in a straw yellow formulation solution. The solid contents were measured and then using a 85:15 mixture of 1-methoxy-2-propanol and diacetone alcohol, the formulations were diluted to 7.12% solids content. The resultant solution was filtered through 0.45 µm filter prior to use.

Example [E-4]

Preparation of Primer Formulation Using Silquest® A-163 Silane-CeO$_2$ Sol

To a 20.0 g of an 11.03% PMMA solution, 11.2 g of ceria sol S-2 was added along with 15 mg of BYK™-331. The primer mixture was shaken well to dissolve the ceria sol which resulted in a straw yellow formulation solution. The solid contents were measured and then using a 85:15 mixture of 1-methoxy-2-propanol and diacetone alcohol, the formulations were diluted to 6.97% solids content. The resultant solution was filtered through 0.45 µm filter prior to use.

Example [E-5]

Preparation of Primer Formulation Using Silquest® A-163 Silane-CeO$_2$ Sol

To a 20.0 g of an 11.03% PMMA solution, 5.90 g of ceria sol S-2 was added along with 15 mg of BYK™-331. The primer mixture was shaken well to dissolve the ceria sol which resulted in a straw yellow formulation solution. The solid contents were measured and then using a 85:15 mixture of 1-methoxy-2-propanol and diacetone alcohol, the formulations were diluted to 7.05% solids content. The resultant solution was filtered through 0.45 µm filter prior to use.

Comparative Example [CE-1]

Preparation of Primer without any UV Absorber

To the primer solution prepared, a solvent mixture of 1-methoxy-2-propanol (382.5 g) and diacetone acetone alcohol (DAA) (67.5 g) (in the weight ratio of 85:15) were added to obtain formulation with solid contents of 7.37%.

Comparative Example [CE-2]

Preparation of Primer Containing Organic UV Absorber

To a 500 mL 3-necked RB flask fitted with overhead stirrer and reflex condenser, 41.85 g of diacetone alcohol and 237.15 g of 1-methoxy-2-propanol were added and stirred. 15.77 g of PMMA (Elvacite® 2041, Lucite International, Inc., Cordova, Tenn.) was then added in portions through a funnel with vigorous stirring at 40° C. After cooling to room temperature, 5.2 g of 2,4-dibenzoyl resorcinol (Aldrich) and 0.02 g of BYK™-331 were added and stirred for 1 h. The resulting pale yellow formulation has solid contents of 7.0%.

Comparative Example [CE-3]

Preparation of Primer Formulation Using Silquest® A1230 Silane-CeO$_2$ Sol

To a 20.0 g of a 9.02% PMMA solution, 10.2 g of ceria sol S-3 was added along with 15 mg of BYK™-331. The primer mixture was shaken well to dissolve the ceria sol which resulted in a straw yellow formulation which was stable over 12 months without any precipitation. The solid contents were measured and then using a 85:15 mixture of 1-methoxy-2-propanol and diacetone alcohol, the formulations were diluted to 4.95% solids content. The resultant solution was filtered through 0.45 µm filter prior to use.

Comparative Example [CE-4]

Preparation of Primer Formulation Using Silquest® A-174 Silane-CeO$_2$ Sol

To a 20.0 g of a 9.02% PMMA solution, 6.88 g of ceria sol S-4 was added along with 15 mg of BYK™-331. The primer mixture was shaken well to dissolve the ceria sol which resulted in a straw yellow formulation which was stable over 12 months without any precipitation. The solid contents were measured and then using a 85:15 mixture of 1-methoxy-2-propanol and diacetone alcohol, the formulations were diluted to 4.8% solids content. The resultant solution was filtered through 0.45 µm filter prior to use.

Comparative Example [CE-5]

Preparation of Primer Formulation Using Silquest® A187 Silane-CeO$_2$ Sol

To a 20.0 g of a 9.02% PMMA solution, 11.24 g of ceria sol S-5 was added along with 15 mg of BYK™-331. The primer mixture was shaken well to dissolve the ceria sol which resulted in a straw yellow formulation which was stable over 12 months without any precipitation. The solid contents were measured and then using a 85:15 mixture of 1-methoxy-2-propanol and diacetone alcohol, the formulations were diluted to 5.13% solids content. The resultant solution was filtered through 0.45 µm filter prior to use.

TABLE 2

The weight ratio of CeO$_2$ and silanes in Primer formulations

| Examples | Sol Used | Wt % Composition of active components in Primer | | | | % Solids of primer solution |
|---|---|---|---|---|---|---|
| | | % CeO$_2$ | % Silane | % PMMA | Ratio of Silane:CeO$_2$ | |
| E-1 | S-1 | 20.02 | 19.52 | 60.46 | 0.98:1 | 5.14% |
| E-2 | S-1 | 15.17 | 14.97 | 69.86 | 0.99:1 | 7.19% |
| E-3 | S-1 | 10.22 | 10.07 | 79.71 | 0.99:1 | 7.12% |
| E-4 | S-2 | 15.14 | 29.84 | 55.02 | 1.97:1 | 6.97% |
| E-5 | S-2 | 10.14 | 19.98 | 69.88 | 1.97:1 | 7.05% |
| CE-1 | — | — | — | 100 | — | 7.37% |
| CE-2 | — | — | — | 75 | — | 7.00% |
| CE-3 | S-3 | 20.09 | 3.49 | 76.42 | 0.17:1 | 4.95% |
| CE-4 | S-4 | 20.03 | 2.89 | 77.08 | 0.14:1 | 4.80% |
| CE-5 | S-5 | 20.03 | 27.79 | 52.18 | 1.39:1 | 5.13% |

Applications of Primer Formulations Coating on Microscopic Glass Slides by Flow Coating Process The microscopic glass slides were cleaned with isopropanol and dried at room temperature for 20 min. The filtered solutions of above primer formulation were flow coated onto the microscopic glass slides, by applying the coating solution using a squeeze bottle. The coated substrates were air-dried at room temperature for 20 min and subsequently at 125° C. for 20 min in a circulated air-oven. These primer formulations coated microscopic glass slides were subjected to optical measurements and accelerated weathering studies.

Application of Primer and Topcoat Coating on PC Substrates by Flow Coating Method:

Polycarbonate (PC) substrates were cleaned with isopropanol and dried at room temperature for 20 min. The filtered solutions of the primer formulations were flow coated onto the PC substrate, by applying the coating solution using a squeeze bottle. The coated substrates were air-dried at room temperature for 20 min and subsequently at 125° C. for 20 min in an air-oven. Substrates coated with PMMA primers containing MTMS or Silquest® A-1230 silane modified ceria appear optically better than other primers. Subsequently, these primer coated PC substrates were coated with silicone hardcoat formulation (SilFORT® AS4700, Momentive Performance Materials) and air-dried at room temperature for 20 min and subsequently at 130° C. for 40 min in an air oven.

Measurements on Coated Substrates

The optical characteristics (Transmission and Haze) were measured using a BYK Gardner Haze Gard™ instrument and the test according to ASTM D 1003. The initial adhesion was measured using a cross hatch adhesion test according to ASTM D3002/D3359. The adhesion is rated in a scale of 5B-0B, 5B indicative of highest adhesion. Adhesion after water immersion was done by immersing the coated PC plates in 65° C. hot water followed by cross hatch adhesion test at different time intervals. Accelerated (weathering) sun testing was conducted by Atlas sun test CPS+ instrument. The substrates were placed in the chamber and subjected to UV dosage 2700 KJ/m$^2$ per 1 hour.

Optical and Adhesion Properties

The % Transmittance and Haze values were measured using a BYK Haze Gard™ instrument, and the values were summarized in Table 3. As shown in the data from Table 4, the haze values are very high for the Silquest® A-174 silane functionalized CeO$_2$ loaded primer coating, while the Silquest® A1230 silane functionalized CeO$_2$ nanoparticles and MTMS functionalized CeO$_2$ nanoparticles showed promising results in terms of optical clarity. The optical properties on PC substrates for comparative examples CE-4 and CE-5, which corresponds to methacryloxypropyltrimethoxy silane (Silquest® A174 silane) and gamma-glycidoxypropyltrimethoxy silane (Silquest® A-187 silane) functionalization, shows highest haze values.

The Ceria loaded primer coating and top coat (SilFORT® AS4700 hardcoat) coated PC substrates were subjected to cross hatch adhesion to measure the initial adhesion of the coating. All the coatings exhibited adhesion of 5B and then the substrates were immersed in a water bath maintained at 65° C. Substrates were removed at various time intervals (up to 30 days) and measured the adhesion. All the coating formulations showed very good adhesion on PC substrates and the results are summarized in Table 3.

TABLE 3

Optical and Adhesion properties on CeO$_2$ loaded Primer coated glass and PC substrates

| | Coating on Glass Microscopic - Slide | | Primer and Topcoat on PC Substrates | | Crosshatch-pull Adhesion Test | |
|---|---|---|---|---|---|---|
| Sample | % T | Haze | % T | Haze | Initial adhesion | After 30 days water soak @ 65° C. |
| E-1 | 91.0 | 0.85 | 88.8 | 1.11 | 5B | 5B |
| E-2 | 91.7 | 2.44 | 88.6 | 1.89 | 5B | 5B |
| E-3 | 92.0 | 1.06 | 89.7 | 1.63 | 5B | 5B |
| E-4 | 91.6 | 1.65 | 89.3 | 1.85 | 5B | 5B |
| E-5 | 91.5 | 0.97 | 88.4 | 2.45 | 5B | 5B |
| CE-1 | 92.3 | 0.2 | 94.0 | 0.24 | 5B | 5B |
| CE-2 | 92.9 | 0.24 | 93.3 | 0.34 | 5B | 5B |
| CE-3 | 91.9 | 0.12 | 88.8 | 0.7 | 5B | 5B |
| CE-4 | 90.3 | 1.20 | 85.2 | 13.6 | 5B | 5B |
| CE-5 | 90.4 | 2.48 | 86.7 | 6.61 | 5B | 5B |

Accelerated Weathering Testing

Primer formulations were prepared with different weight ratios of CeO$_2$ and methyltrimethoxy silane and the coatings were evaluated and subjected to accelerated sun test studies. The accelerated sun test studies were carried out using Atlas Sun Test CPS+(Florida conditions) and the microscopic glass slides that were coated with primer coating. The substrates were then placed in the Sun Test instrument along with PMMA without any UV absorbers (CE-1) and with organic UV absorber (CE-2). The samples were withdrawn every 200 hour cycle, and the optical properties and thickness were measured. The thickness of the primers loaded with Silquest® A-1230-CeO$_2$ and MTMS-CeO$_2$ were measured up to a 1200 hour cycle, which is equivalent to 1 year under normal conditions. The values are summarized in Table 4. A plot of thickness variation with respect to the sun test irradiation time were measured and shown in FIG. 5.

Figure 5:
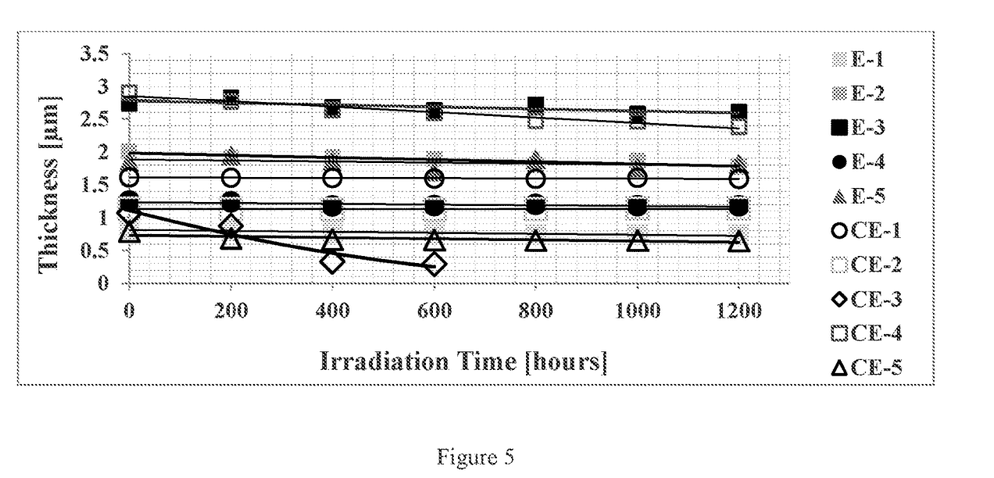
FIG. 5 is a graph showing results of accelerated sun testing on glass slides for primer films employing $CeO_2$ modified according to the present technology compared to $CeO_2$ modified with organofunctional silanes.
Figure 6:
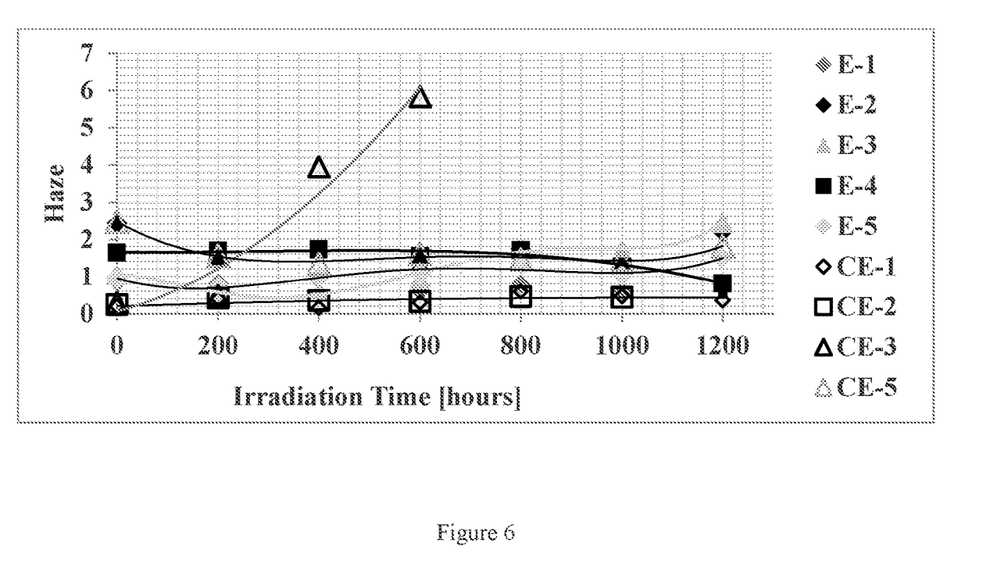
FIG. 6 is a graph showing variation of haze with accelerated sun test time for different primer films.
Figure 7:
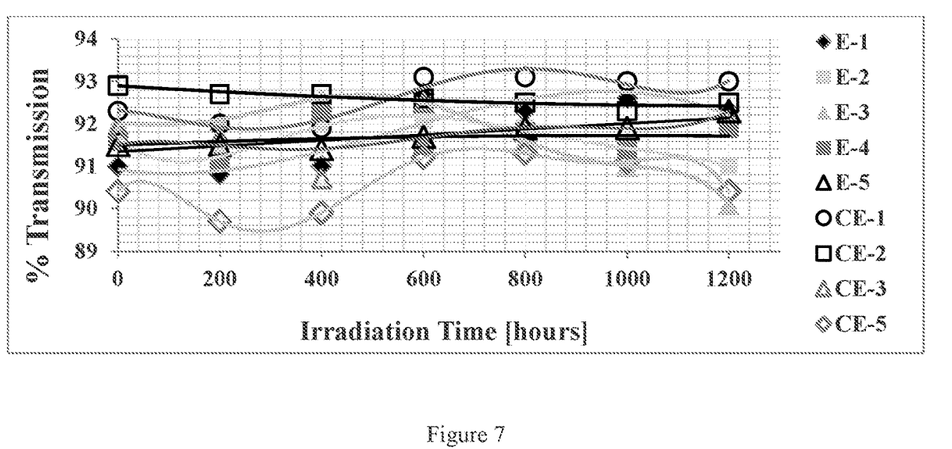
FIG. 7 is a graph showing variation of percent transmission (% T) with accelerated sun test time for different primer films.

Table 4 shows the results comparing a primer formulation without any UV absorber (CE-1) and an organic UV absorber (CE-2) to other formulations employing ceria functionalized with different silanes. Comparative Examples CE-3 to CE-5 employ ceria functionalized with certain organofunctional silanes and working Example (E-1 to E-5) employs a functionalized ceria in accordance with aspects or embodiments of the present invention. The results are illustrated in FIG. 5. During accelerated sun test irradiation, comparative examples CE-3, CE-4 and CE-5 resulted in thickness loss as well as loss in optical clarity. In the case of the primer employing the MTMS functionalized CeO$_2$, thickness and optical clarity are maintained to a greater extent as compared with the primer formulation with organic UV absorber (CE-2).

TABLE 4

Variation of thickness with accelerated sun test on microscopic glass slides with different silanes. Samples were tested for 1200 hrs.

| Sample | Initial Thickness (μm) | Thickness Reduction (μm/100 hr) | % Reduction/100 hr | Initial Haze | Δ Haze/ 100 hr |
|---|---|---|---|---|---|
| E-1 | 0.82 | 0.0075 | 0.91% | 0.85 | −0.0017 |
| E-2 | 2.01 | 0.015 | 0.75% | 2.44 | 0.0158 |
| E-3 | 2.74 | 0.0017 | 0.06% | 1.06 | 0.1250 |
| E-4 | 1.25 | 0.0025 | 0.2% | 1.65 | −0.0783 |
| E-5 | 1.85 | — | — | 0.95 | −0.0142 |
| CE-1 | 1.61 | 0.0017 | 0.1% | 0.2 | 0.0133 |
| CE-2 | 2.73 | 0.0125 | 0.46% | 0.24 | 0.0250 |
| CE-3* | 1.07 | 0.13 | 12.15% | 0.3 | 0.9217 |

TABLE 4-continued

Variation of thickness with accelerated sun test on microscopic glass slides with different silanes. Samples were tested for 1200 hrs.

| Sample | Initial Thickness (μm) | Thickness Reduction (μm/100 hr) | % Reduction/100 hr | Initial Haze | Δ Haze/ 100 hr |
|---|---|---|---|---|---|
| CE-4 | 2.9 | 0.0442 | 1.49% | 1.2 | 3.7917 |
| CE-5 | 0.79 | 0.0125 | 1.58% | 2.44 | −0.0517 |

*the sample was removed after 600 h due to significant decrease in the Primer thickness Primer formulations with different weight ratios of $CeO_2$ and MTMS silane were prepared [E-1 to E-5] and then subjected to accelerated sun test studies. The results are summarized in Table 4 and FIG. 5. The data in Table 4 and FIG. 5 show that $CeO_2$ protected with MTMS in the (silane: metal oxide) weight ratio of 0.9:1 and 2:1 shows excellent properties. It has been found that higher loading of MTMS helped to provide a stable dispersion in the organo sol and in the primer matrix with protective shell, and it also provided a composition that avoided the photodegradation of PMMA, which was accelerated by $CeO_2$.

Figure 8:
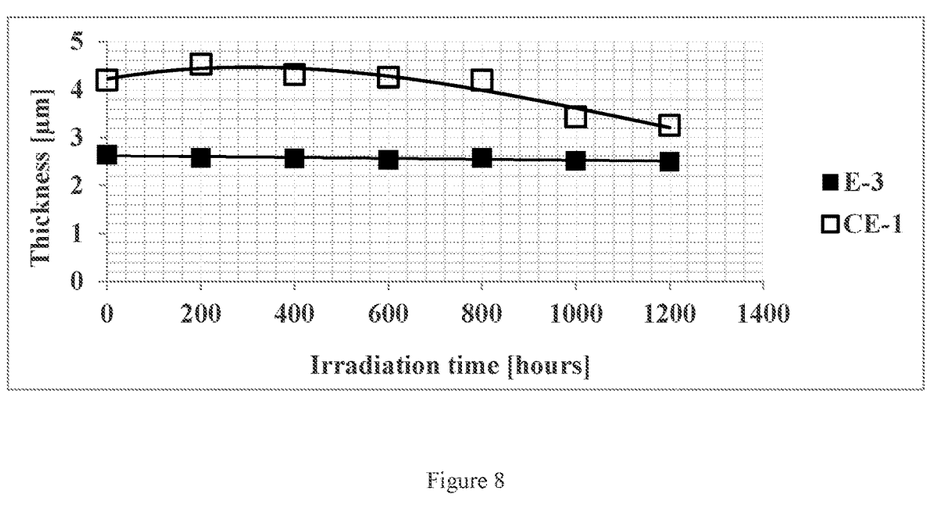
FIG. 8 is a graph showing accelerated sun testing for a polycarbonate (PC) substrate coated with a primer in accordance with embodiments of the technology and a silicone based top coat.

PC substrates coated with primer formulation E-3 with SilFORT® AS4700 topcoat were subjected to accelerated sun test studies. The initial optical, adhesion properties, primer and top-coat thicknesses were measured then subjected to sun test studies. Substrates were removed every 200 h interval of time and the properties were measured and summarized in Table 5. The primer and top-coat thicknesses variation with respect to irradiation time were plotted and shown in FIG. 8.

TABLE 5

Summary of sun test results for primer (E-3) with top-coat on PC Substrate

| | Primer Thickness with Examples | | | TopCoat Thickness (SilFORT ® AS4700 Hardcoat) | | |
|---|---|---|---|---|---|---|
| Sample | Initial Thickness (μm) | Thickness Reduction (μm/100 hr) | % Reduction/ 100 hr | Initial Topcoat Thickness | Thickness Reduction (μm/100 hr) | % Reduction/ 100 hr |
| E-3 | 2.65 | 0.0125 | 0.0047% | 5.66 | 0.014 | 0.0025% |
| CE-1 | 4.2 | 0.075 | 0.02% | 6.48 | −0.107 | −0.0165% |

The foregoing description identifies various non-limiting embodiments of a thermal management assembly. Modifications may occur to those skilled in the art and to those who may take and use the invention. The disclosed embodiments are merely for illustrative purposes and not intended to limit the scope of the invention or the subject matter set forth in the claims.

What is claimed is:

1. A primer composition comprising:
   (a) cerium oxide particles, wherein the surface of the cerium oxide particles is modified with a silane such that the silane is applied directly to the cerium oxide particles surface and the silane is of the formula:

where $R^1$, $R^2$, $R^3$, and $R^4$ are independently chosen from a C1-C10 alkyl;
   (b) from about 45 wt. % to about 80 wt. % of an organic polymer based on the dry weight of a film formed from the composition, wherein the organic polymer is chosen from a homopolymer of an alkyl acrylate, a copolymer of an alkyl acrylate, a polycarbonate, a polyvinylpyrrolidone, a polyvinylbutyral, a poly(ethylene terephthalate), poly(butylene terephthalate), or a combination thereof; and
   (c) a solvent
   wherein the silane is present in an amount of about 10 wt. % to about 30 wt. % based on the dry weight of a film formed from the composition, and the weight ratio of silane to cerium oxide particles is 0.9:1 to 2:1.

2. The primer composition of claim 1, wherein $R^1$, $R^2$, $R^3$, and $R^4$ are independently chosen from a C1-C4 alkyl.

3. The primer composition of claim 1, wherein the solvent is chosen from an alcohol, an acetone, a ketone, an ether, or a combination thereof.

4. The primer composition of claim 1, wherein the organic polymer is chosen from a homopolymer of an alkyl acrylate, a copolymer of an alkyl acrylate, or a combination thereof.

5. The primer composition of claim 1, wherein the organic polymer is polycarbonate.

6. The primer composition of claim 1, wherein the organic polymer is chosen from a polyvinylpyrrolidone, a polyvinylbutyral, or a combination of two or more thereof.

7. The primer composition of claim 1, wherein the cerium oxide particles have a particle size of about 1 nm to about 190 nm.

8. The primer composition of claim 1, wherein the cerium oxide particles have a particle size of about 10 nm to about 100 nm.

9. A primer composition comprising:
   (a) cerium oxide particles, wherein the surface of the cerium oxide particles, is modified with a silane such that the silane is applied directly to the cerium oxide particles surface and the silane is of the formula:

where $R^1$, $R^2$, $R^3$, and $R^4$ are independently chosen from a C1-C10 alkyl;
   (b) from about 45 wt. % to about 80 wt. % of an organic polymer based on the dry weight of a film formed from the composition, wherein the organic polymer is chosen from a homopolymer of an alkyl acrylate, a copo- lymer of an alkyl acrylate, a polycarbonate, a polyvinylpyrrolidone, a polyvinylbutyral, a poly(ethylene terephthalate), poly(butylene terephthalate), or a combination thereof; and (c) a solvent wherein the silane is present in an amount of about 10 wt. % to about 30 wt. % based on the dry weight of a film formed from the composition, and the weight ratio of silane to cerium oxide particles is 0.9:1 to 2:1, and the composition is free of an ionic surfactant.

10. A method of making a primer composition comprising:

combining (a) cerium oxide particles with (b) an organic polymer chosen from a homopolymer of an alkyl acrylate, a copolymer of an alkyl acrylate, a polycarbonate, a polyvinylpyrrolidone, a polyvinylbutyral, a poly(ethylene terephthalate), poly(butylene terephthalate), or a combination thereof and (c) a solvent, wherein the surface of the cerium oxide particles, is modified with a silane such that the silane is applied directly to the cerium oxide particles surface and the silane is of the formula:

where R1, R2, R3, and R4 are independently chosen from a C1-C10 alkyl, the organic polymer is present in an amount of from about 45 wt. % to about 80 wt. % based on the dry weight of a film formed from the composition, the silane is present in an amount of about 10 wt. % to about 30 wt. % based on the dry weight of a film formed from the composition, and the weight ratio of silane to cerium oxide particles is 0.9:1 to 2:1.

11. A substrate and a primer film disposed on at least a portion of a surface of the substrate, the primer film comprising:

(a) cerium oxide particles wherein the surface of the cerium oxide particles, is modified with a silane such that the silane is applied directly to the cerium oxide surface and the silane is of the formula:

where $R^1$, $R^2$, $R^3$, and $R^4$ are independently chosen from a C1-C10 alkyl; and (b) from about 45 wt. % to about 80 wt. % of an organic polymer based on the dry weight of the primer film, wherein the organic polymer is chosen from a homopolymer of an alkyl acrylate, a copolymer of an alkyl acrylate, a polycarbonate, a polyvinylpyrrolidone, a polyvinylbutyral, a poly(ethylene terephthalate), poly(butylene terephthalate), or a combination thereof;

wherein the silane is present in an amount of about 10 wt. % to about 30 wt. % based on the dry weight of the primer film, and the weight ratio of silane to cerium oxide particles is 0.9:1 to 2:1.

12. The substrate of claim 11, wherein $R^1$, $R^2$, $R^3$, and $R^4$ are independently chosen from a C1-C4 alkyl.

13. The substrate of claim 11, wherein the organic polymer is chosen from homo and copolymers of alkyl acrylates, polycarbonate, polyvinylpyrrolidone, polyvinylbutyral, poly(ethylene terephthalate), poly(butyl ene terephthalate), or a combination thereof.

14. The substrate of claim 11, wherein the primer film comprises (i) the cerium oxide particles in an amount of from about 10 wt. % to about 25 wt. %, and (ii) the silane in an amount of from about 10 wt. % to about 30 wt. %, the wt. % being based on the weight of the dry film, and wherein the weight ratio of silane to cerium oxide particles is 1:1.

15. The substrate of claim 11, wherein the primer film comprises the cerium oxide particles in an amount of about 10 wt. % to about 20 wt. % and the silane in an amount of from about 10 wt. % to about 20 wt. %, the wt. % being based on the weight of the dry film.

16. The substrate of claim 11, wherein the substrate is chosen from an acrylic polymer, a polyamide, a polyimide, an acrylonitrile-styrene copolymer, a styrene-acrylonitrile-butadiene terpolymer, a polyvinyl chloride, a polyolefin, a polycarbonate, a copolycarbonate, or a combination thereof.

17. The substrate of claim 11 comprising a silicone hardcoat overlying the primer film.

* * * * *